Figure 1:
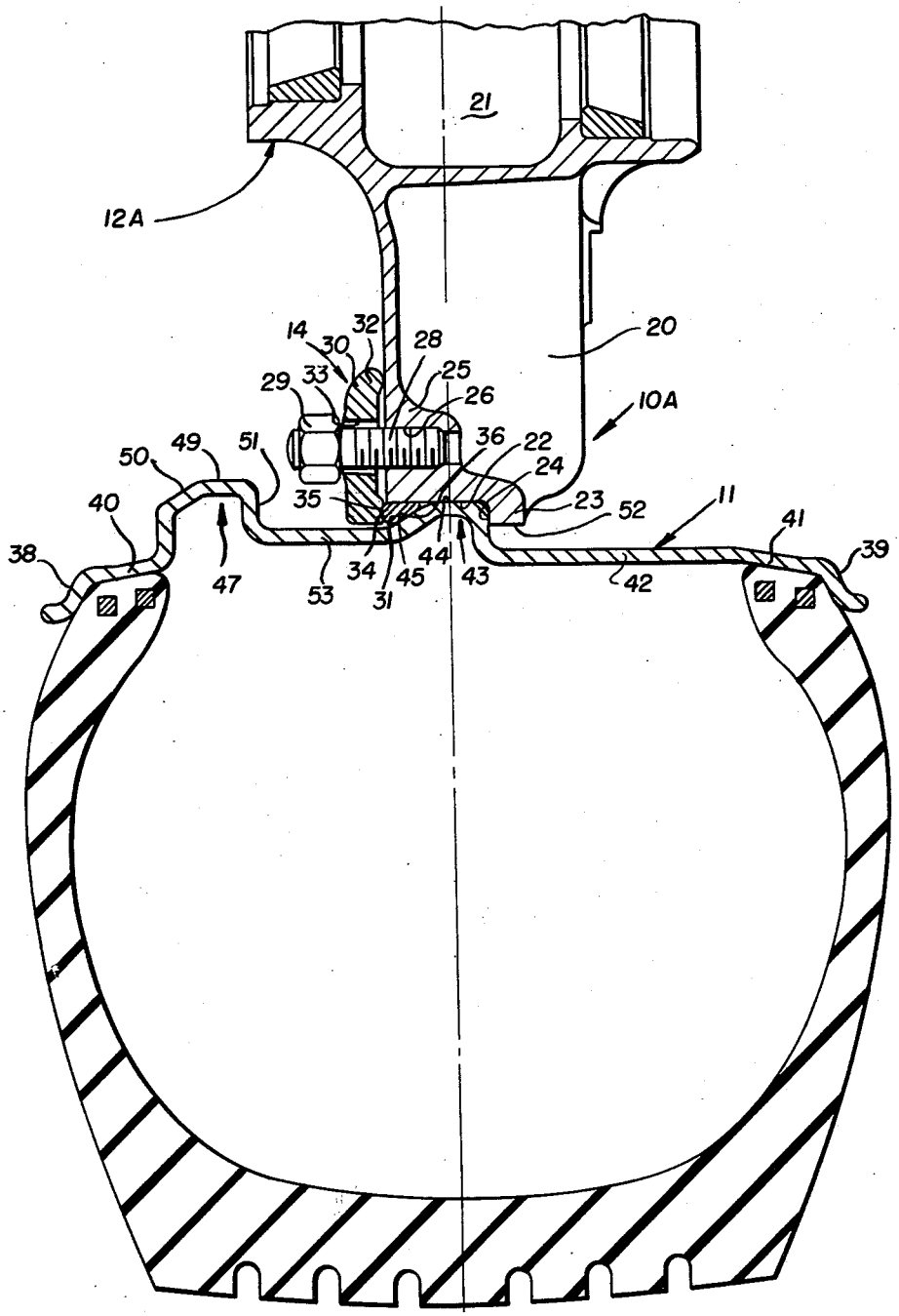

INVENTOR.
DANIEL A. WALTHER

INVENTOR.
DANIEL A. WALTHER
BY Hamilton & Cook
ATTORNEYS

United States Patent Office 3,186,767
Patented June 1, 1965

3,186,767
RIM AND WHEEL ASSEMBLIES
Daniel A. Walther, Dayton, Ohio, assignor to The Dayton Steel Foundry Company, Dayton, Ohio, a corporation of Ohio
Filed May 9, 1962, Ser. No. 198,391
6 Claims. (Cl. 301—10)

The present invention relates to rim and wheel assemblies for mounting tires. More particularly, the present invention relates to rim and wheel assemblies particularly intended for the mounting of relatively "wide bead" or "wide base" truck tires. Specifically, the present invention relates to novel concepts for rim and wheel assemblies for mounting "wide bead" or "wide base" tires on either the principal load bearing wheels or the steered wheels of a truck, or similar motor vehicle, with equal facility.

The relatively wide bead or wide base truck tire, also currently being referred to by the trade names "Duplex" or "Super Single" tires, is a recent innovation. The advantages claimed for such a tire include greater off-the-road and over-the-road stability for the vehicle, wider spring spacing, higher load carrying capacity, elimination of hazards originating from driving on duals when one tire is flat and reduction in inventory of spare tires. In any event, the relatively wide base truck tire renders conventional rim and wheel assemblies technically obsolescent and requires new concepts of mounting.

When a wide bead tire is placed on the principally load bearing wheel of a truck, which is usually the rear wheel, the major technical consideration is to mount the tire so that the weight of the truck is transferred to the tire within that symmetrical plane of the tire which is perpendicular to the rotational axis of the wheel on which the tire is mounted. In terms of a vector analysis the center of application of the load should be effective through the centroid of the tire.

However, when a similar tire is mounted on a steered wheel the frictional resistance of the large surface contact area of the tire on the roadway requires a mounting orientation such that the pivot point of the tire on the roadway lies within that symmetrical plane of the tire which is perpendicular to the rotational axis of the tire or the wheel.

The prior art does not provide a wide bead tire and rim assembly which can be selectively or interchangeably mounted on either the principally load bearing or steered wheel and provide proper orientation of the tire embodying the considerations unique to each mounting situation.

It is therefore an object of the present invention to provide a rim and wheel assembly for mounting wide base tires whereby a rim carrying such a tire can be selectively or interchangeably mounted on the steered or load bearing wheels of the vehicle and function on either with equal facility.

It is a further object of the present invention to provide a rim construction having the bead flanges spaced sufficiently wide apart to accommodate a wide base truck tire and have dual mounting ribs.

It is a still further object of the present invention to provide a rim construction having an inboard mounting surface which is preferably used to secure the rim to the rear or load bearing wheels and an outboard mounting surface to secure the rim to the front or steered wheels and which can also, if desired, be used for securing the rim to the rear wheels.

It is a still further object of the present invention to provide novel concepts of rim construction which can be applied to the construction of either a so-called "drop center rim" or the "flat base rim."

These and other objects which will become apparent in the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Figure 2:
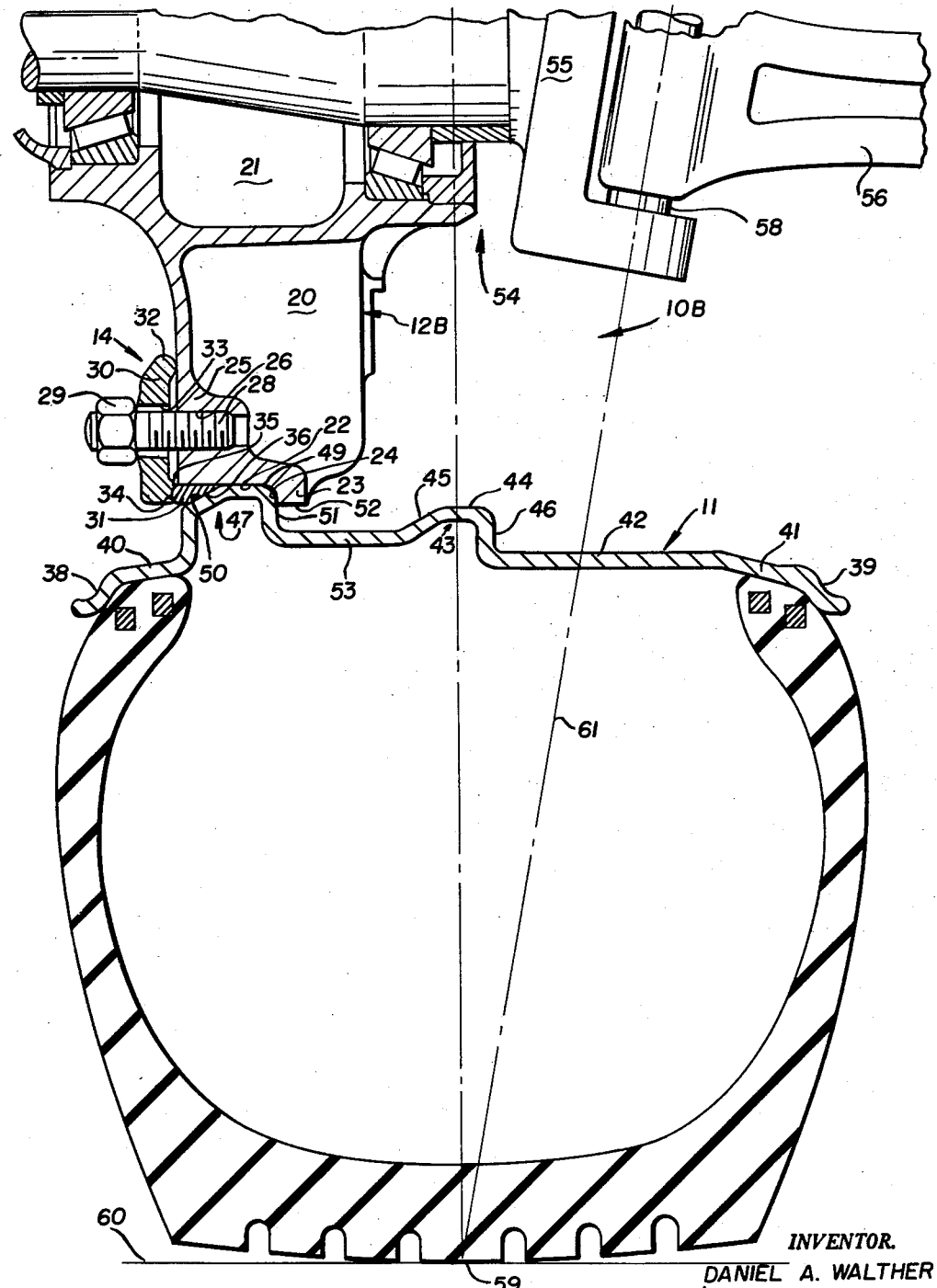

In the drawings:

FIG. 1 is a cross section of a rim and wheel assembly embodying the concept of the present invention in which the rim is mounted on the wheel by the inboard rib; and FIG. 2 is a view similar to FIG. 1 in which the rim is depicted as being mounted on the outboard rib.

A rim and wheel assembly according to the invention, for mounting wide bead truck tires, including clamping lugs, is referred to hereafter and indicated generally by the numeral 10A for a rim and wheel assembly in which the rim is mounted by the inboard rib and 10B for a rim and wheel assembly in which the rim is mounted by the outboard rib.

The improved rim, indicated generally by the numeral 11, used in an assembly 10A or 10B, has peripheral flanges for seating the tire bead, a relatively wide web or base portion connecting the bead flanges to provide the requisite spacing for the beads of a mounted tire, and two relatively narrow radially inwardly directed rib members—one located medially or inboard of the web and the other located on the outboard portion of the web—each having a preferably flat and horizontal axially extending load bearing surface for selective seating of one of the rib members on the felly surfaces of a wheel, a radially oriented stop or aligning surface and an axially inclined mounting surface. The inner diameters of the load bearing surfaces on the inboard and outboard ribs are unequal, the inboard rib being of greater diameter than the outboard rib.

The improved wheels, indicated generally by the numerals 12A and 12B when used in an assembly 10A and 10B, respectively, have a relatively narrow load bearing felloe or "felly" surface on the outboard ends of any desired number of radially extending spoke members and a radially outwardly directed flange portion at the axially inner end of the felly surface providing an axially inward stop or orienting surface for a rim 11.

The rim 11 is secured on the wheel 12A or 12B by any suitable clamp means or device, such as a series of bolt supported clamp lugs, indicated generally by the numeral 14.

Referring to the drawings, a wheel 12A or 12B may have any desired number of spoke members 20 extending radially from a hub area 21 and terminating at their outer ends in a preferably accurately machined load bearing or felly surface 22. The sole difference between wheel 12A and wheel 12B is that the radii of the spoke members 20 on wheel 12B are shorter than the radii of the spoke members 20 on wheel 12A, in an amount and for a reason hereinafter more fully explained.

The axially inner end of each relatively narrow felly surface 22 is terminated abruptly by a radially outwardly directed flange 23. The axially outer face 24 of said flange 23 is accurately machined to provide a positive stop or orienting surface for one or the other of the ribs on rim 11. This surface 24 is preferably oriented substantially perpendicularly to the rotational axis of the wheel 12A or 12B for example, at a vertical angle of 80° to 90°, substantially as shown.

At the axially outer end of each felly surface 22, each spoke member 20 is provided with a boss 25 having a threaded bore 26 for attachment of the clamp lug 14 as by a stud bolt 28 and a nut 29.

Each clamp lug 14 may be of the type disclosed in the applicant's Patent No. 3,013,842. For example, clamp lug 14 may be comprised of a lever portion 30 and a wedging portion 31. The lever portion 30 has a radially directed upright leg 32 with a slot 33 to receive the supporting bolt 28. The radially outer region of lever portion 30 has an axially inwardly projecting leg 34 for engaging the axially outer surface 35 of wedging portion 31. The wedging portion 31 of clamp 14 extends axially inwardly along the face of the wheel felly surface 22 and terminates in an axially inward axially inclined conical face or mounting surface 36 for wedging engagement with the axially outer side of either the inboard or outboard rib of rim 11. The conical face 36 is beveled at a standard clamping angle: e.g., approximately 28°, as shown.

Rim 11 has low side flanges 38 and 39 for confining the outer edge of each tire bead. These side flanges extend radially outwardly from the integrally formed peripheral bead flanges 40 and 41 which may have either standard 5° or the standard 15-20° taper for the actual seating of each tire bead. The web portion 42 of the rim extends between the axially inner flanges 39 and 41 and the axially outer flanges 38 and 40.

The medial portion of the web 42 is formed to provide an inboard rib or load bearing member 43. The radially inward face 44 of the inboard rib 43 is flat and horizontal to provide an annularly continuous surface for selective seating against the felly surfaces 22 of the wheel 12A.

The axially outer side of the inboard rib 43 is axially inclined at a suitable angle to provide an annularly continuous surface 45 for wedging engagement by the conical mounting surface 36 of the wedging portion 31 of clamp lug 14.

The axially inner side of said inboard rib 43 is radially oriented at a suitable angle to provide an annularly continuous stop surface 46 for mating engagement with the machined stop surface 24 of each spoke flange 23.

Axially outwardly of the inboard rib 43 an outboard rib or load bearing member 47 is formed. The radially inward face 49 of the outboard rib 47 is flat and horizontal to provide an annularly continuous surface for selective seating against the felly surfaces 22 of the wheel 12B.

The axially outer side of the outboard rib 47 is axially inclined at a suitable angle to provide an annularly continuous surface 50 for wedging engagement by conical mounting surface 36 on the wedging portion 31 of a clamp lug 14.

The axially inner side of said outboard rib 47 is radially oriented at a suitable angle to provide an annularly continuous stop surface 51 for mating engagement with the machine stop surface 24 of each spoke flange 23.

The inboard rib 43 is identical to the outboard 47 except in that the outboard rib extends radially inwardly further than the inboard rib. This difference in radial dimension is at least equal to, and preferably slightly greater than, the height, or radial extension, of the flange 23 on the radially outermost portion of each spoke member 20 in order to provide a clearance between the outermost surface 52 of flange 23 and the radially innermost surface 44 of rib 43 when the rim 11 is moved axially on to mounting position on wheel 12B, as shown in FIG. 2.

It is thus apparent that the difference in radius of the spoke members 20 on wheel 12B is less than the radius of the spoke members 20 on wheel 12A by an amount equivalent to the difference in the radial dimension between ribs 43 and 47.

The drop center base 53 which extends axially between the inboard rib 43 and the outboard rib 47, on the embodiment shown, is generally parallel to and radially inwardly of the web 42: i.e., the diameter of base 53 is less than that of web 42. This radially inward disposition of base 53 together with the inboard rib 43 and the outboard rib 47 constitutes the drop center of the rim 11 which facilitates mounting of a wide base tire on an integrally formed rim. If the concept of the present invention is incorporated in a rim of the flat base type, the portion of the rim corresponding to base 53 may be of the same radius as web 42.

When mounting the rim 11 on a rear, or principal load bearing, wheel 12A it is necessary to transfer the load carried by that wheel to the tire mounted thereon as close to the axial center of the tire as possible to prevent eccentric loading thereof, and thus provides stability and greater tire life to that tire. Thus, the inboard rib 43, which is medially of the rim, is preferably used to mount rim 11 on a rear wheel 12A.

However, when a wide base tire is mounted on a steerable wheel, additionally critical considerations are involved. The extreme width of contact of the wide base tire tread with the surface of the road way can provide an extremely large frictional resistance to the free turning of the tire through the steering mechanism. The applicant has discovered that this frictional resistance is largely negated if the tire is so mounted that the center of the contact area the tire has with the pavement, or road way, and the pivotal axis about which the wheel is steered intersect.

As shown in FIG. 2, the front rim and wheel assembly 10B is mounted on a typical running gear assembly, designated generally by the numeral 54. The knuckle 55 which supports the wheel throughout the turning radius of the wheel is pivotally connected to the axle 56 by kingpin 58 which is angularly inclined with respect to a true vertical plane. The running gear described is well known to the prior art and constitutes no part of the present invention.

By properly placing the rib 47 outboard of the inboard rib 43 the rim 11 can be mounted on the wheel 12B so that the center, at 59, of that portion of the tire contacting the road way 60, lies along the extended center line 61 of the kingpin 58. That is, the extended line of the kingpin, which represents the pivotal axis about which the wheel is steered, intersects the pavement at the center of the contact area the tire has with the road way. The tire so mounted performs as a stable component of the steered running gear.

It is thus readily apparent that a rim and wheel assembly constructed according to the concept herein disclosed accomplishes the objects of the invention.

What is claimed is:

1. A rim for mounting wide bead tires having peripheral flanges for seating the tire beads, a web portion connecting the bead flanges, two ribs extending radially inwardly from said web portion, the first of said ribs located medially of said flanges, the second of said ribs located between said first rib and one of said peripheral flanges, each of said ribs having a flat and horizontal load bearing surface, the inner diameter of the load bearing surface on said first rib being of greater diameter than the inner diameter of the load bearing surface on said second rib.

2. A rim for mounting wide bead tires having peripheral flanges for seating the tire beads, a web portion connecting the bead flanges, two ribs extending radially inwardly from said web portion, the first of said ribs located medially of said flanges, the second of said ribs located between said first rib and one of said peripheral flanges, each of said ribs having an axially inclined mounting surface, a flat and horizontal load bearing surface and a radially disposed stop surface, the inner diameter of the load bearing surface on said first rib having a diameter greater than the inner diameter of the load bearing surface on said second rib.

3. A drop center rim for mounting wide bead tires having peripheral flanges for seating the tire beads, a web portion connecting the bead flanges, two ribs extending radially inwardly from said web portion, the first of said ribs located medially of said flanges, the second of said ribs located between said first rib and one of said peripheral flanges, each of said ribs having an axially inclined mounting surface and a flat and horizontal load bearing surface, a rim base portion extending between said ribs, said base portion being of lesser diameter than said web portion, said two ribs and said base portion comprising the drop center of said rim.

4. A drop center rim for mounting wide bead tires having peripheral flanges for seating the tire beads, a web portion connecting the bead flanges, two ribs extending radially inwardly from said web portion, the first of said ribs located medially of said flanges, the second of said ribs located between said first rib and one of said peripheral flanges, each of said ribs having an axially inclined mounting surface, a flat and horizontal load bearing surface and a radially disposed stop surface, a rim base portion extending between said ribs, said base portion being of lesser diameter than said web portion, said two ribs and said base portion comprising the drop center of said rim.

5. A rim for wide bead tires, said rim to be interchangeably mounted on wheels having either of two diameter felly surfaces, each of said felly surfaces being on the outward ends of radially extending spoke members and having a radially outwardly directed flange at the axially inner end thereof, said rim comprising peripheral flanges for seating the tire beads, a relatively wide web connecting the bead flanges and two ribs extending radially inwardly from said web portion, each of said ribs having a radially inward face which is flat and horizontal to provide an annularly continuous surface for selective seating against said felly surfaces and an axially inner side which is oriented to provide a surface for engagement with said felly surface flange portions, the inner diameter of the radially inward faces of said ribs being different.

6. A rim for wide bead tires, said rim to be interchangeably mounted on wheels having either of two diameter felly surfaces, each of said felly surfaces being on the outward ends of radially extending spoke members and having a radially outwardly directed flange at the axially inner end thereof, said rim comprising peripheral flanges for seating the tire beads, a relatively wide web connecting the bead flanges and two ribs extending radially inwardly from said web portion, the first of said ribs being located medially of said base portion, the second of said ribs being located between said first rib and one of said peripheral flanges, each of said ribs having a radially inward face which is flat and horizontal to provide an annularly continuous surface for selective seating against said felly surfaces and an axially inner side which is oriented to provide a surface for engagement with said felly surface flange portions, the inner diameter of the radially inward face of said first rib being greater than the inner diameter of the radially inward face of said second wheel.

References Cited by the Examiner

UNITED STATES PATENTS

| 1,501,821 | 7/24 | Steingruber | 301—10 |
| 1,608,805 | 11/26 | Moorhouse | 280—96.1 |
| 2,019,109 | 10/35 | Ash | 301—65 |
| 2,110,654 | 11/37 | Swain et al. | 301—9 X |
| 2,167,102 | 7/39 | Burger | 301—12 |
| 3,007,741 | 11/61 | Brown | 301—13 |

FOREIGN PATENTS 346,913   4/31   Great Britain.

ARTHUR L. LA POINT, *Primary Examiner.*

RICHARD A. DOUGLAS, MILTON KAUFMAN,
*Examiners.*